UNITED STATES PATENT OFFICE.

ALBERT P. LEE AND MAGNUS C. ANDERSON, OF CHICAGO, ILLINOIS, ASSIGNORS, BY DIRECT AND MESNE ASSIGNMENTS, TO LEE TRAILER & BODY COMPANY, OF CHICAGO, ILLINOIS, A CORPORATION OF ILLINOIS.

REAR-DUMP VEHICLE.

Application filed February 10, 1922. Serial No. 535,451.

*To all whom it may concern:*

Be it known that we, ALBERT P. LEE and MAGNUS C. ANDERSON, citizens of the United States, residing at Chicago, in the county of Cook and State of Illinois, have invented a certain new and useful Improvement in Rear-Dump Vehicles, of which the following is a full, clear, concise, and exact description, reference being had to the accompanying drawings, forming a part of this specification.

Our invention relates to rear dump vehicles, and more particularly to a rear dump vehicle which has a low center of gravity.

It is a purpose of the invention to provide a rear dump vehicle which is adapted to roll from load carrying to discharge position substantially automatically and to return from discharge to load carrying position substantially automatically after being emptied, and to provide such a vehicle which has a very low center of gravity both when empty and when loaded. Ordinarily where a hopper is provided that rolls substantially automatically from load carrying to dumping position the vehicle has a comparatively high center of gravity and accordingly does not ride as easily as a vehicle which has a lower center of gravity.

It is a purpose of the present invention to provide a rear dumping vehicle of the character referred to above with a pair of rails or rockers which are adapted to cooperate with runways or rails mounted on the vehicle, the rolling surfaces of which runways or rails are located below the upper surface of the vehicle framework.

It is still a further purpose of the invention to provide a vehicle of the above mentioned character with a runway for the rolling hopper which is mounted on a supporting framework having runway supporting members which are depressed below the top surface of the vehicle framework so as to obtain a low loading edge and a correspondingly low center of gravity for the vehicle when both loaded and unloaded.

It is also a purpose of the invention to provide a rail or runway on said framework which has an upwardly curved portion in substantially vertical alignment with the springs and associated parts adjacent the rear wheels of the vehicle so as to make it possible to lower the runway as greatly as possible without interfering with the operation of the devices located adjacent the rear wheels.

It is still a further object of the invention to provide a rail or rocker on the rolling hopper which cooperates with the rail having the upwardly curved or upwardly bowed portion which is substantially straight from end to end thereof, and which extends diagonally downward from the hopper, thus providing an inclined rail on the hopper and an upwardly curved rail on the vehicle framework.

It is another object of the invention to provide a vehicle of the above mentioned character with a hopper having an end gate that may be opened both at the upper and lower edge thereof as desired, and which is provided with means for automatically opening the end gate when the hopper has rolled to the proper dumping angle relative to the framework.

It is also an object of the invention to provide pivot hooks on the runway so that the hopper may pivot to final dumping position if it is desired to dump the same at an angle more nearly perpendicular to the ground, such a dumping position being desirable where a material that is difficult to dump, such as wet concrete, is being handled.

It is also an object of the invention to provide new and improved means for locking the hopper in load carrying position, which automatically operates to lock the hopper in position.

Other objects and advantages of the invention will appear as the description of the accompanying drawings proceeds. However, we desire to have it distinctly understood that we do not intend to limit ourselves to the exact details shown or described, but that we intend to include as part of our invention all such obvious changes a person skilled in this art, and as would fall within the scope of the claims.

Referring in detail to the drawings, the improved rear dump vehicle comprises a framework 20 which is provided with the rear wheels 21 mounted on the rear axle 22, which is driven by means of a suitable driving connection 23, said framework being mounted on said axle by means of the springs 24 which are connected thereto by means of the pivoted levers 25, said springs 24 being connected to the rear cross member of the frame 20 by means of the U-bolts 27 and the plates 28. The transverse member 26 is secured in any desired manner to the longitudinally extending members 29 of the framework 20. Mounted on the framework 20 is a supplemental framework comprising the transverse members 30 and 32 and the longitudinally extending members 33 and 34. The members 30 are secured to the longitudinally extending members 29 by means of the U-bolts 35 which extend through the flanges 36 of the angle plates 37 secured to the members 30. At each end of the members 30 is provided a downwardly extending bracket member 38 to which the forward end portion of the longitudinally extending members 33 and 34 are secured. The rear transverse member 32 is secured to the longitudinally extending members 29 of the framework 20 by means of the U-bolts 40 and is provided with brackets 41 extending downwardly therefrom at opposed for bracing the same. Secured to the brackets 41 are the side members 43 of the upwardly bowed portions 44 of the side members 33 and 34 respectively. The side members 33 and 34 serve as runways or rails for the hopper 45 which is mounted thereon, and which is adapted to roll automatically from load carrying to discharge position when filled and substantially automatically from discharge position to load carrying position when empty.

Figure 2:
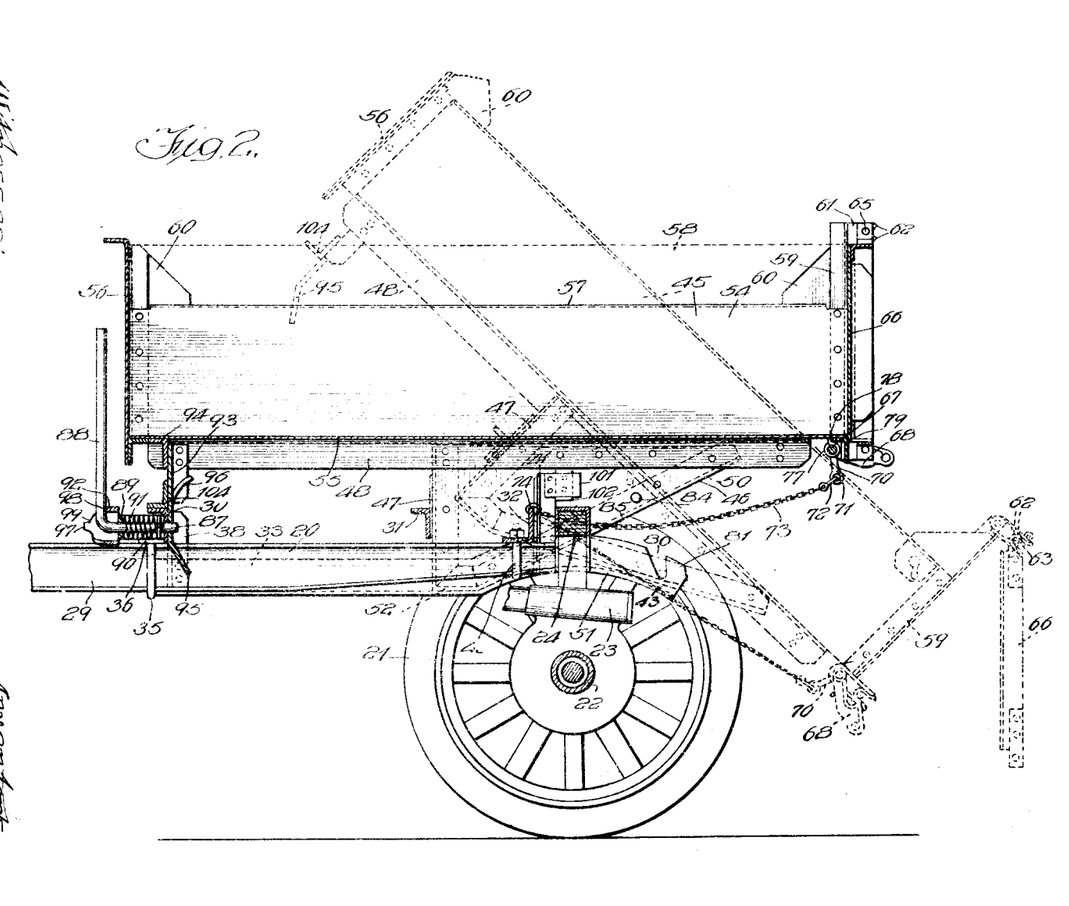
Fig. 2 is a longitudinal sectional view of the structure shown in Fig. 1 showing the hopper in dumping position in dotted lines, said section being taken substantially on the line 2—2 of Fig. 3.
Figure 3:
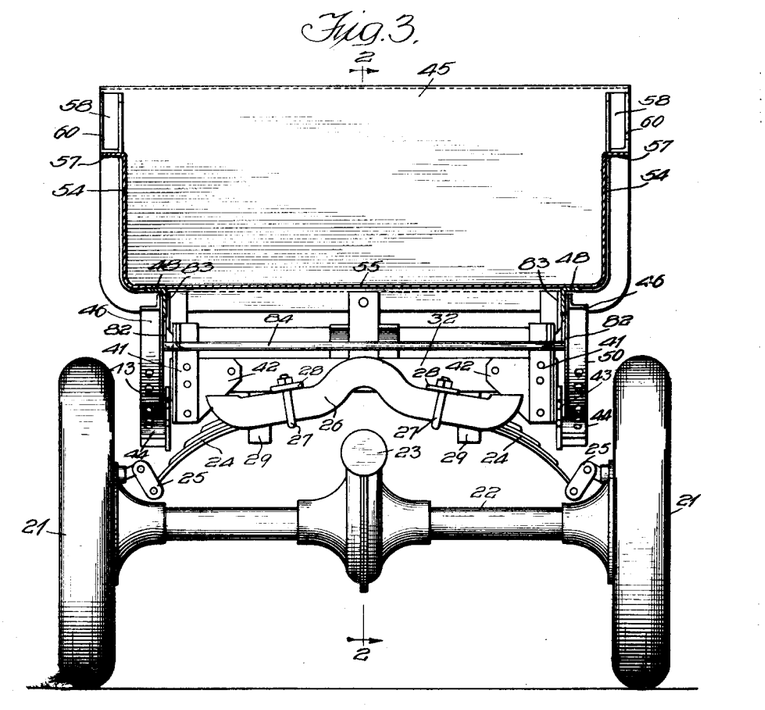
Fig. 3 is a section taken on the line 3—3 of Fig. 1.
Figure 4:
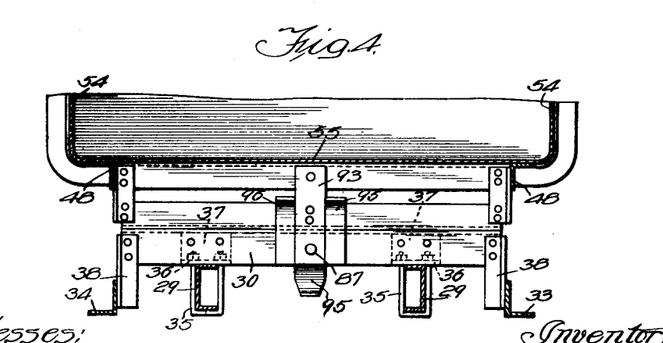
Fig. 4 is a fragmentary sectional view taken on the line 4—4 of Fig. 1.
Figure 5:
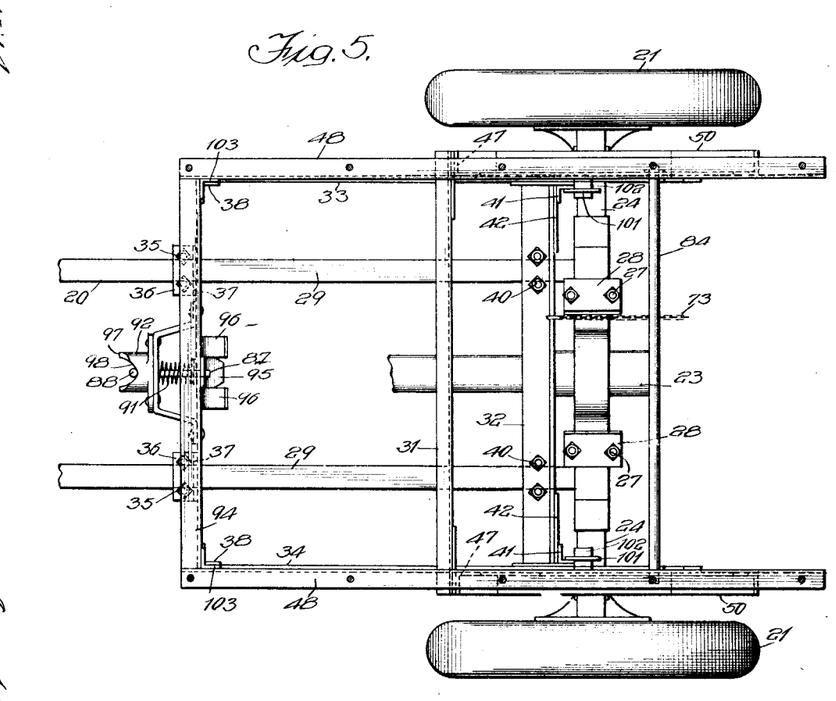
Fig. 5 is a horizontal sectional view taken on the line 5—5 of Fig. 1.
Figure 6:
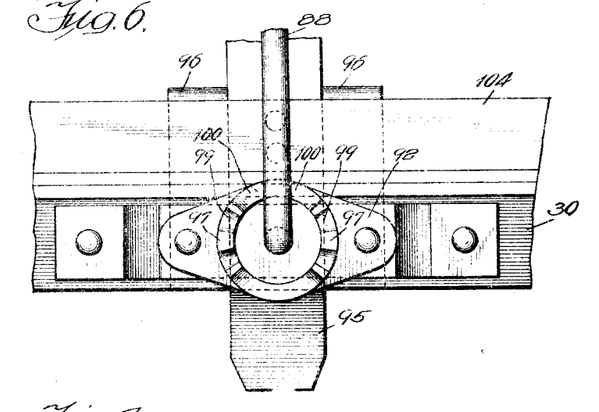
Fig. 6 is a fragmentary view of the locking mechanism for the hopper looking at the same from the end of the vehicle.

The hopper 45 is provided with a pair of rockers comprising the obliquely extending members 46 and the vertically extending members 47, said members being secured to the angles 48 which are secured to the underside of the hopper 45. The vertically extending member 47 and the obliquely extending member 46 are connected by the horizontally extending portions 49. It will be seen that the flanges 50 of the portions 46 cooperate with the curved bearing surfaces 51 of the upwardly bowed portions 44 of the side members 33 and 34 and that the flanges 52 of the horizontally extending portions 49 cooperate with the straight flanges 53 of the side members 33 and 34 so that as the hopper 45 is tilted toward the rear, as shown in dotted lines in Fig. 2, the same will roll substantially automatically to the dotted line position and the inclined or oblique portions of the rockers will cooperate with the upwardly bowed portions of the rails or runways, the contact points between the rockers and the rails moving first upwardly along the curved portions of the rails and then downwardly again to the rear end portions thereof. The curvature of the rails and the angle of the rockers is such that the center of gravity of the load will be constantly lowered as the hopper moves toward dumping position, and the direction of the force exerted by the weight will be such that the same will be acting slightly in advance of the contact point between the rockers and the rails at all times during the dumping movement of the hopper, thus providing for automatic movement to dumping position. The vertically extending members 47 of the rockers are connected together by means of the transversely extending angle 31 so as to provide a transversely extending brace for the rocker structure. The straight portions 52 of the rocker members rest on the straight portions 53 of the rails or runways when the hopper 45 is in load carrying position, thus supporting the hopper in a substantially stable position. The body of the hopper comprises the side walls 54, the bottom 55 and the front end wall 56. The side walls 54 are provided with ledges or flanges at 57 for receiving side boards or extensions 58 which are adapted to rest beside members 54.

Figure 1:
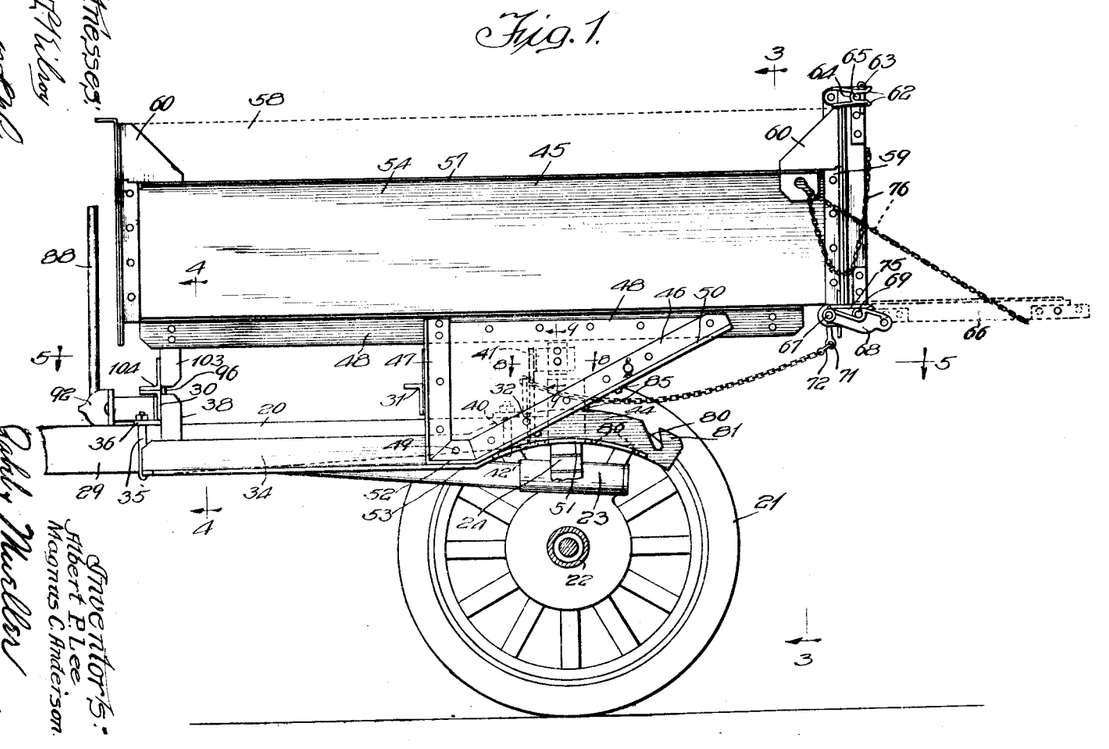
Fig. 1 is a side elevation of the rear portion of a vehicle, such as an automobile truck having our improved rolling hopper construction applied thereto.

The plates 60 are provided for bracing the side boards and aid in holding the same in position on top of the flanges 57. The angles 59 are provided with brackets 61 having pairs of ears 62 which are perforated to receive the pin 63 and which have a curved portion 64 connecting the same, so as to provide pivots for the pivot pins 65 of the end gate 66. Pivotally mounted at 67 on the angles 59 are the latches 68 which are adapted to cooperate with the pins 69 to lock the end gate 66 in closed position. The pivot member 67 extends transversely from one side to the other of the body, and is provided with an arm 70 adapted to turn therewith which has an eye 71 on the end thereof for receiving the snap hooks 72 on the end of the chain 73, the other end of the chain 73 being secured to the angle 32 so that the end gate 66 will be automatically unlocked when the hopper reaches its dumping position due to the fact that the distance between the point of attachment 74 of the chain 73 to the member 32 to the eye 71 is increased as the hopper is dumped. The chain can, of course, be adjusted to open the end gate at any desired position, but it is preferred that the same opens when the hopper has reached substantially the end of its rolling movement. The side boards 58 are not used ordinarily when the hopper is used as a rolling dumping hopper, but may of course be so used if necessary. The hopper is also adapted to be used as an express body at which time the side boards 58 are particularly used. When the body is used as an express body, it is desirable to open the end gate to the dotted position shown in Fig. 1, and for this purpose a bracket 75, which is similar to the bracket 61, is provided, the pivot pins 69 pivoting between the side members or ears of the bracket 75 when the end gate is to be open to the dotted line position, the customary chain 76 being provided for limiting the movement of the end gate. It is, of course, to be understood that the pin 63 is removed when this movement of the end gate 66 is desired. It is also preferred to unhook the snap hook 72 from the eye 71 when the end gate is dropped to horizontal position so that the latch 68 cannot be accidentally unlocked. The latch 68 is normally held in locking position by means of a coil spring 77 which extends around the shaft 67 and is secured thereto at one end thereof, and which has the end portion 78 engaging with the angle 79 on the hopper 45 for limiting the movement thereof in one direction.

The curved portions 44 of the side members 33 and 34 are provided with inclined the hopper 45 is provided with a rod extending between the members 46, said rod being adapted to cooperate with the slots forming sockets to permit pivoting of the hopper about the rod 84 when the same has reached the end of its rolling movement to obtain complete dumping thereof when materials hard to dump, such as wet concrete, are used. The rockers are provided with projections 85 which are adapted to engage with openings 86 in the runways to keep the rockers and runways in proper relationship to each other.

It will be noted that the rolling surface of the runway is lower than the top surface of the vehicle framework 20, and it will also be noted that if the runway were straight from the front to the rear thereof, the same could not be as low as is the runway with the curved portions 47, this being due to the fact that the springs 24 would interfere with the runway if the same were straight and as low as shown.

It will thus be seen by using the supplemental framework with the dropped side members, a certain amount of lowering of the center of gravity is obtained by making the rails or runways with curved portions. While in the drawings a type of truck is shown which has a transverse spring which would interfere with the rail if straight, it will be obvious that in many other types of trucks other parts of the truck adjacent the wheels, such as the brake drums or springs of a different type, might interfere with the placing of the rails in the lowermost position, and the upwardly bowed portions of the rails would be of advantage in such a structure also. By using the rocker and the curved rail the body is located at no higher level than if a curved rocker and straight rail were used and the additional advantage of being able to lower the rail without interference with the spring is obtained.

Suitable means are provided for locking the hopper in load carrying position, said means being shown as comprising a locking bolt 87 which has the integral handle 88 extending laterally therefrom, said locking bolt being provided with a collar at 89 and a stop pin at 90 between which the coil spring 91 is mounted. The spring 91 is compressed between the member 89 and the member 90. The member 89 abutting against the casting 92 and being free to slide on the member 87, while the pin 90 extends through the bolts 87, the bolt 87 will be forced toward the right in Fig. 2 due to the compression of the spring 91. The pin 87 extends through an opening in the angle 30 and also through an opening in the depending bracket member 93 which is secured to the angle 94 mounted on the bottom 55 of the body 45. The member 93 is provided with an obliquely extending end portion 95 and the angle 30 is provided with curved guide members 96 on opposite sides of the member 93, so as to guide the member 93 into proper position so that the opening therein will be in alignment with the opening in the member 30 and with the bolt 87, to properly receive the bolt. The casting 92 is provided with a cam surface having the projecting portions 97, the receding portions 98 and the intermediate portions 99.

Figure 7:
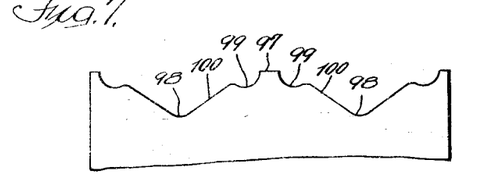
Fig. 7 is a development in a plane of the cam member comprising a portion of the locking mechanism.
Figure 8:
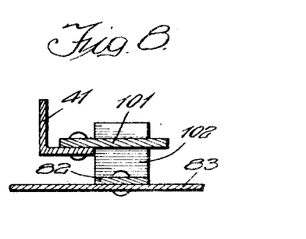
Fig. 8 is a section taken on the line 8—8 of Fig. 1.
Figure 9:
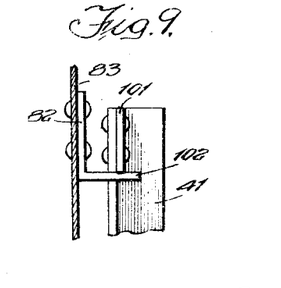
Fig. 9 is a section taken on the line 9—9 of Fig. 1.

It will be seen that as the handle 88 is turned from a vertical position, at which time the same will be in engagement with the receding portion 98 of the cam surface, toward a horizontal position that the same will first engage with the inclined surfaces 100, and as the handle rides along one of these surfaces the bolt 87 will be withdrawn. After the same has passed over this surface the handle will engage with the portion 99 of the cam surface, which is made somewhat in the form of a socket, where the same will rest in such a position that the bolt 87 will be withdrawn from locking position, the highest portions 97 serving as stops to limit the movement of the handle.

Means is also provided for preventing the upward movement of the hopper relative to the vehicle framework at the rear end thereof, said means comprising the angles 82 secured to the members 48 by means of the brackets 83, said angles 82 engaging with the horizontally extending member 101 which is secured to the angle 41 in any desired manner. As the horizontally extending flange 102 of the angle 82 engages beneath the member 101, the hopper will be held from upward movement relative to the vehicle framework 20. The forward end of the hopper is provided with depending bracket members 103 at opposite sides thereof to which the angle 104 is secured, said angle 104 engaging with the angle 30 when the hopper is in load carrying position to support the same at the forward end thereof.

Figure 10:
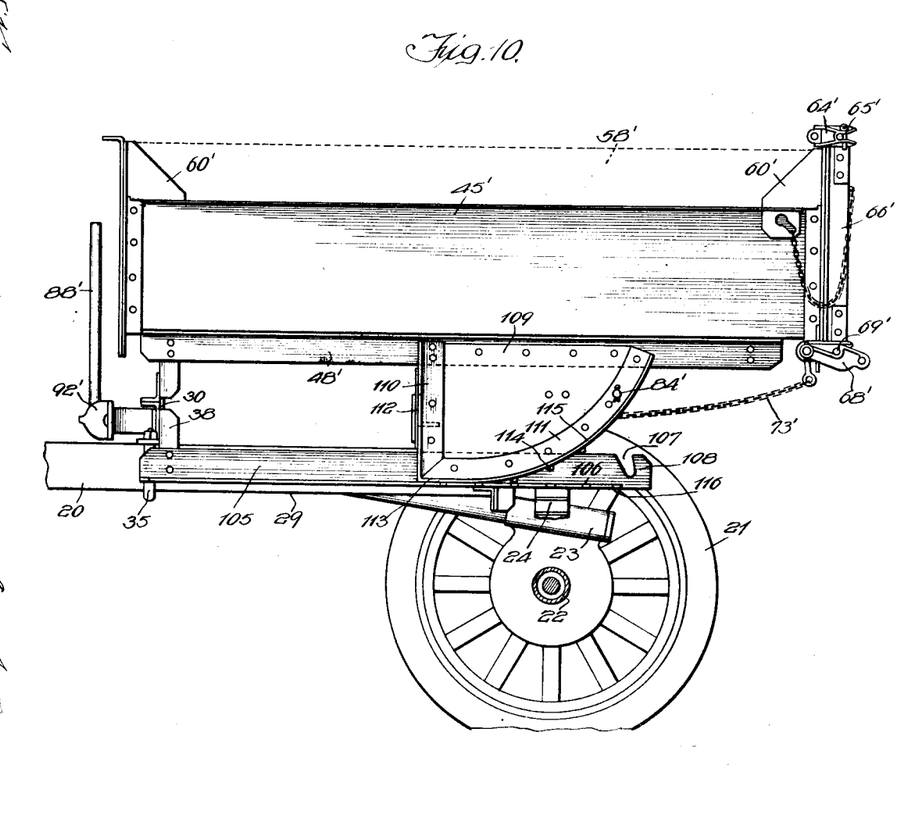
Fig. 10 is a view similar to Fig. 1 showing a slightly different form of rocker and rail.

Referring to Fig. 10, it will be seen that instead of providing a rail having an upwardly bowed portion and a rocker having a straight inclined surface, the rail members 105 are provided which are straight. Said rail members 105 are provided with openings 106 similar to the openings 86 in the rail members in the other form and having slots 107 forming socket members, and providing hook-like end portions 108 on said rails. The rails form the longitudinally extending members of a framework similar to that shown in Figs. 1 to 9 inclusive, the forward transverse member 30 of said framework being shown in Fig. 10, said framework being provided with the brackets 38 to which the longitudinally extending members 105 are secured. The member 30 is secured to the framework 20 of the vehicle by means of the U-bolts 35 as described in connection with Figs. 1 to 9. The wheels 21, springs 24 and rear axle 22 being designated by the same numerals in Fig. 10 as in the other figures. The body portion 45' having the end gate 66' pivoted on the pivot member 65' mounted in the brackets 64' and having the locking latch 68' operated by the chain 73' is made in precisely the same manner as the body shown in Figs. 1 to 9 inclusive, the end gate being double acting due to the provision of the pivot pins 69' acting in the same manner as the pivot pins 69. The hopper 45' is provided with the plate 60' for holding the side boards 58' and is provided with a lever 88' cooperating with the member 92' to lock the hopper in load carrying position in the same manner as the lever 88 is operated to lock the hopper 45 in load carrying position. The longitudinally extending members 48' on the body 45' are provided with rockers comprising the horizontally extending portions 109 secured to the members 48', the vertically extending portion 110 and the arcuate portion 111. The rockers on opposite sides of the body are secured together by means of the angle member 112. The rockers are provided with a short straight portion at 113 merging with the arcuate portion 111, the portions 113 of the rockers engaging with the rails or runways when the hopper is in load carrying position and the curved portions 111 engaging with the rails as the hopper rolls to dumping position. The rockers are provided with a rod 84' corresponding to the rod 84 of the form shown in Figs. 1 to 9 inclusive, which cooperates with the socket members 107 to cause the hopper to dump with a final pivotal movement when desired. The curved rail 111 is provided with projections 114 which are adapted to enter the openings 106 to hold the rockers in proper relationship with the rails. In this form it will be seen that the bearing surfaces 115 of the rockers will engage with the rolling surfaces 116 on the rails always at points below the top surface of the vehicle framework.

It will be seen from the above that in both forms of the invention the runway for the rolling hopper is positioned below the top surface of the vehicle framework upon which the hopper is mounted, and that this is accomplished by providing a supplemental framework having transversely extending supporting members and underslung or depressed longitudinally extending members, said members depending from brackets provided on the cross members.

It is desirable to obtain as long a roll for the hopper as possible, as the center of gravity on the hopper can then be placed further forward relative to the rear axle which better distributes the load on the wheels of the vehicle. Where a short roll is provided, the center of gravity can move lengthwise only a small distance, whereas where a longer roll is provided, a much greater movement will result. Accordingly, if desired, a rocker can be used with a longer rolling surface without raising the center of gravity undesirably with the present construction, or the center of gravity can be lowered as much as the bearing surface of the rail is lowered below that which it would have if placed on top of the framework of the vehicle, if this is preferred. In other words, the center of gravity can be both lowered and moved forwardly when the hopper is in load-carrying position due to this construction, or can be either lowered or moved forwardly as desired. Either form of rail and rocker construction can be used but preferably the form with the upwardly bowed portion is used to obtain a maximum lowering of the rolling surface.

It will be noted that a very low loading edge can be obtained by this arrangement. In an actual construction, the loading edge of the hopper is positioned substantially 48 inches above the rolling surface for the wheels of the vehicle.

Having thus described our invention, what we desire to claim and secure by U. S. Letters Patent is:

1. In a vehicle, a vehicle framework, a rear axle, a supplemental framework mounted on said vehicle framework, said supplemental framework comprising a longitudinally extending runway depressed below the top of said vehicle framework and extending over said rear axle.

2. In a vehicle, a vehicle framework, a rear axle, said framework having a fixed cross member adjacent the rear axle, a supplemental framework mounted on said vehicle framework, said supplemental framework comprising a longitudinally extending runway depressed below the top of said vehicle framework and extending over said rear axle and rearwardly beyond the same.

3. A device of the character described comprising a vehicle framework, wheels carrying said framework and a runway mounted on said framework and depressed below the top surface of said framework, said runway having a portion extending between said wheels and said framework.

4. In a device of the character described, a vehicle framework, and a supplemental framework mounted on said vehicle framework comprising the transversely extending members resting on said vehicle framework and longitudinally extending members having upwardly bowed portions depending from said transversely extending members.

5. In a device of the character described, a vehicle framework, a dumping body, and a longitudinally extending runway on which said body is adapted to roll to dumping position, said runway having a straight portion and an upwardly bowed portion and being depressed below the top surface of said framework, and said body having a rocker cooperating with said runway.

6. In a device of the character described, a vehicle framework, a dumping body and a runway on which said body is adapted to roll to dumping position, said runway having an upwardly bowed portion and a straight portion and being depressed below the top surface of said framework, and said body having a rocker cooperating with said runway, said rocker having a straight inclined face cooperating with said bowed portion and a face engaging said straight portion.

7. A device of the character described comprising a vehicle framework, a supplemental framework comprising longitudinally extending rails mounted thereon, said rails having upwardly bowed portions and being depressed below the top surface of said framework, and a dumping body having rockers thereon engaging with said rails, said rockers having inclined faces cooperating with the upwardly bowed portions of said rails and straight portions resting on straight portions of said rails when said body is in load carrying position.

8. In a device of the character described, a vehicle framework, a rear axle, and a runway on said framework having an upwardly bowed portion substantially concentric with said axle, said runway being depressed below the top surface of said framework.

9. In a device of the character described, a vehicle framework, a dumping body, and a runway on which said body is adapted to roll to dumping position, said runway being depressed below the top surface of said framework, said body and framework having means for holding said body from upward movement relative to said framework at the rear end thereof, said means comprising flanges on said body engaging with cooperating brackets on said runway.

10. In a device of the character described, a vehicle framework, a rear axle, wheels thereon, and a runway on said framework having an upwardly bowed portion substantially concentric with said axle, said runway being depressed below the top surface of said framework and extending between said framework and said wheels.

11. In a device of the character described, a vehicle framework, a rear axle, and a supextending members and depressed below the same, said longitudinally extending members extending over and rearwardly beyond said rear axle and constituting a runway.

12. In a vehicle, a framework, a rear axle our names this 6th day of February A. D., 1922.

ALBERT P. LEE.
MAGNUS C. ANDERSON.